(12) United States Patent
Nunez

(10) Patent No.: US 7,574,850 B1
(45) Date of Patent: Aug. 18, 2009

(54) CASTER WHEEL LOCKING SYSTEM FOR WALK-BEHIND MOWER

(75) Inventor: Dimitri Nunez, Waxhaw, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/136,488

(22) Filed: Jun. 10, 2008

(51) Int. Cl.
*A01D 34/00* (2006.01)

(52) U.S. Cl. ........................... 56/16.7; 16/35 R

(58) Field of Classification Search .......... 56/1, 56/16.7, 322, 17.2, 17.5; 16/35 R
See application file for complete search history.

(56) References Cited

U.S. PATENT DOCUMENTS

| | | | |
|---|---|---|---|
| 4,026,365 A | | 5/1977 | Andersson et al. |
| 4,195,466 A | * | 4/1980 | Heismann .................... 56/10.5 |
| 4,368,806 A | * | 1/1983 | Raineri ........................ 188/2 R |
| 4,875,696 A | * | 10/1989 | Welch et al. |
| 5,020,308 A | * | 6/1991 | Braun et al. ................. 56/11.3 |
| 5,297,379 A | * | 3/1994 | Smith ......................... 56/11.8 |
| 5,303,450 A | | 4/1994 | Lange |
| 5,467,583 A | * | 11/1995 | Beugelsdyk et al. ......... 56/10.8 |
| 5,653,096 A | | 8/1997 | Edwards |
| 5,680,748 A | * | 10/1997 | Barnard ....................... 56/11.3 |
| 5,727,285 A | * | 3/1998 | Goman |
| 5,819,514 A | | 10/1998 | Firdaus |
| 5,983,614 A | * | 11/1999 | Hancock et al. .............. 56/16.7 |
| 6,240,713 B1 | | 6/2001 | Thomas |
| 6,266,949 B1 | * | 7/2001 | Eavenson et al. ................. 56/1 |
| 6,321,878 B1 | | 11/2001 | Mobley et al. |
| 6,880,202 B2 | | 4/2005 | Thompson et al. |
| 7,070,188 B2 | | 7/2006 | Waldman et al. |
| 7,213,818 B2 | * | 5/2007 | Chang ..................... 280/47.38 |
| 2001/0047642 A1 | * | 12/2001 | Kent et al. .................... 56/16.7 |
| 2003/0204933 A1 | * | 11/2003 | Yeh ............................. 16/35 R |

\* cited by examiner

*Primary Examiner*—Thomas B Will
*Assistant Examiner*—Joan D Misa

(57) ABSTRACT

A caster wheel locking system is provided for a walk-behind mower. The system includes a caster wheel lock on each of the front caster wheels that locks and aligns the front caster wheels in a forward direction if the traction drive bar is in the forward drive position, and unlocks the front caster wheels to allow the front caster wheels to steer freely if the traction drive bar is in the neutral position. A traction drive bar is connected to the handle and moves between a neutral position and a forward drive position in which the pair of rear wheels rotate to propel the mower forward.

12 Claims, 3 Drawing Sheets

CASTER WHEEL LOCKING SYSTEM FOR WALK-BEHIND MOWER

FIELD OF THE INVENTION

This invention relates to grass mowing machines, and specifically to walk-behind mowers having rear driven wheels and front caster wheels.

BACKGROUND OF THE INVENTION

Walk-behind mowers may be provided with caster wheels on the front of a mower deck and driven wheels on the rear of the deck. The caster wheels can pivot or steer with respect to the mower deck when the mower is turned, so that the operator is not required to raise the front or rear of the mower deck, or slide the wheels over the turf, during a turn. Front caster wheels reduce the effort required to maneuver the mower through a turn. Each front caster wheel may include an upright shaft which may be pivotally held within a cylindrical opening. As the mower makes a turn, the shaft pivots within the opening to allow the caster wheel to pivot. Thus, front caster wheels generally prevent turf from being scuffed or otherwise damaged during a turn of a walk-behind mower.

Some walk-behind mowers allow an operator to lock the front caster wheels for straight, lengthy cuts. Locking the front caster wheels also may help the mower maintain a straight cutting path along the side of a hill or bank by preventing the mower from sliding sideways down the slope. The caster wheel locking mechanisms may be mechanically actuated at or adjacent the pivoting shaft of each caster wheel. Additionally, during straight travel, the operator may engage a self-propel rear wheel drive mechanism using a lever or control located on or adjacent the mower handle.

When the operator needs to turn the mower, he or she may disengage the self-propel drive mechanism to stop the mower, and then disengage each of the caster wheel locking mechanisms. Otherwise, the mower does not obtain the full benefit of the caster wheels during a turn. After turning the mower, the operator may lock the casters again, and then engage the self-propel drive mechanism to resume a straight cutting path.

A caster wheel locking system is needed for a walk-behind mower that reduces the time and effort to engage the front caster wheels during straight cuts, and disengage the front caster wheels during turns. A caster wheel locking system is needed that increases productivity by allowing engagement and disengagement of the front caster wheels without stopping the mower.

SUMMARY OF THE INVENTION

A caster wheel locking system for a walk-behind mower reduces mowing time and effort by automatically engaging the front caster wheels during straight cuts, and disengaging the front caster wheels during turns. The caster wheel locking system increases productivity by engaging and disengaging the front caster wheels without stopping the mower. The caster wheel locking system includes a caster wheel lock on each front caster wheel. Each caster wheel lock can lock and align the front caster wheels in a forward direction if the traction drive bar is in the forward drive position, and can unlock the front caster wheels to allow them to steer freely if the traction drive bar is in the neutral position. The traction drive bar is connected to the handle and can move between a neutral position and a forward drive position in which the pair of rear wheels rotate to propel the mower forward.

DESCRIPTION OF THE PREFERRED EMBODIMENT

Figure 1:
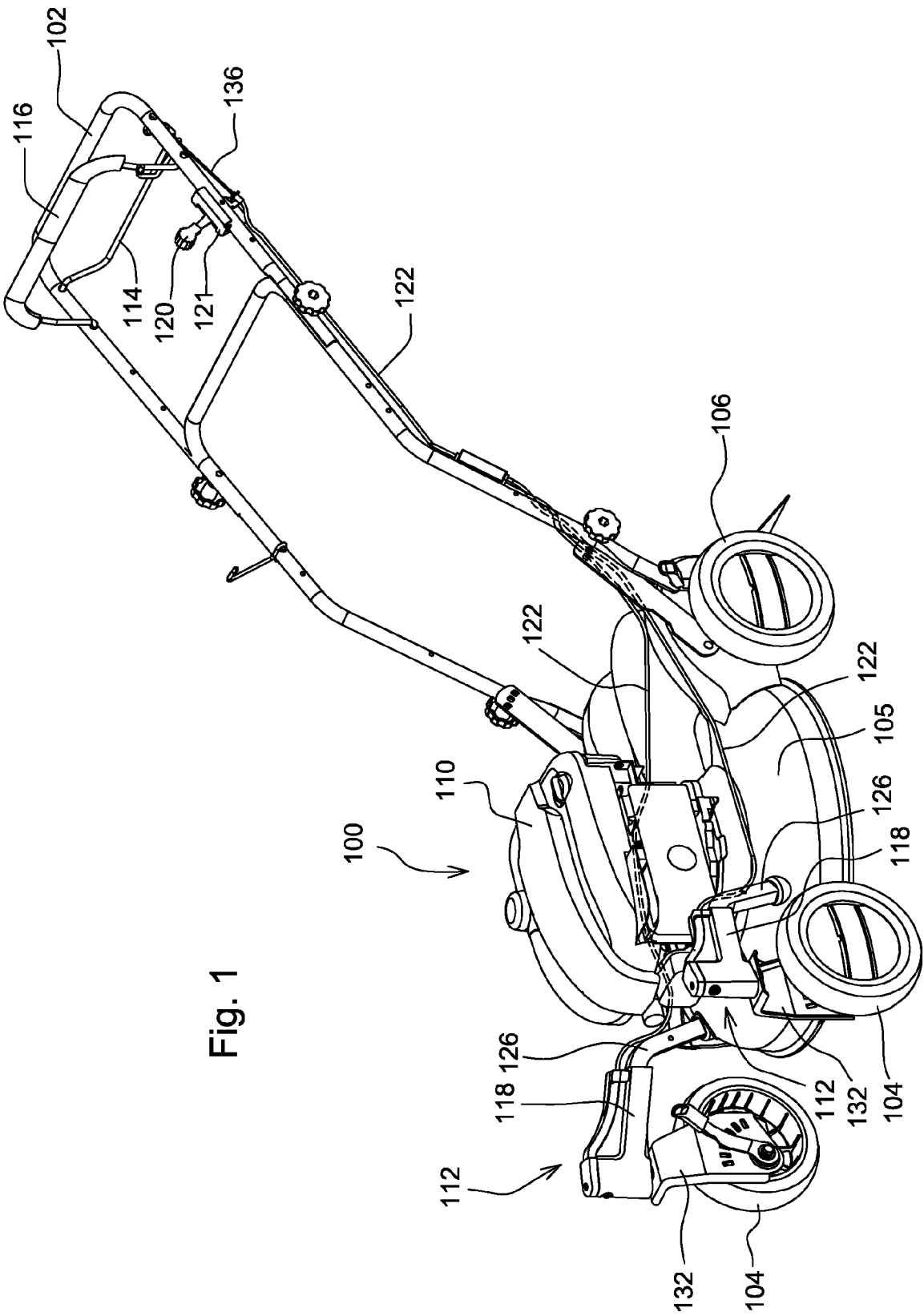
FIG. 1 is a perspective view of a walk-behind mower with a caster wheel locking system according to a first embodiment of the invention.
Figure 2:
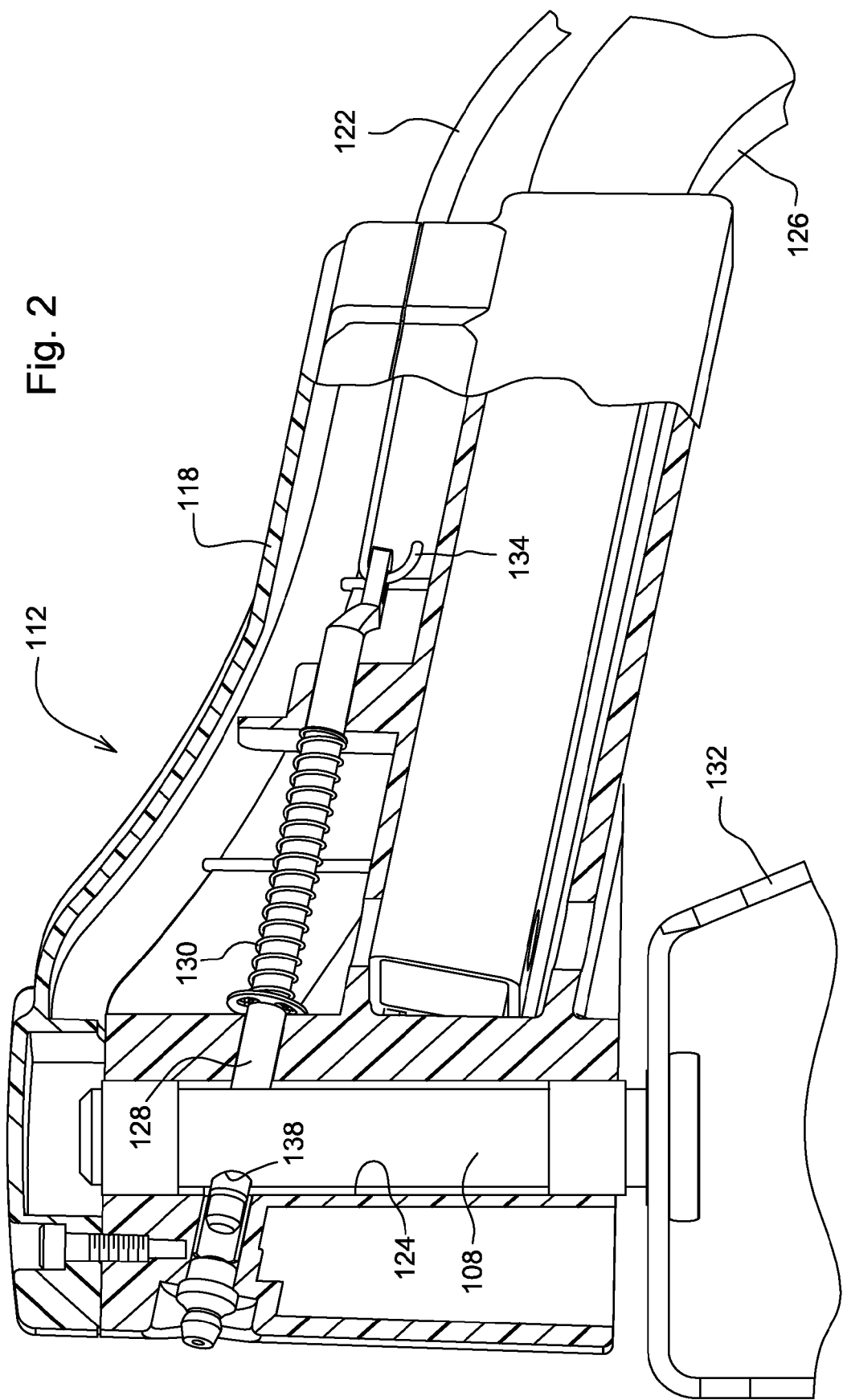
FIG. 2 is a side view of a front wheel with the caster wheel locking system of a first embodiment of the invention.

In a first embodiment shown in FIGS. 1-5, walk-behind mower 100 is provided with handle 102 attached to mower deck 105. The mower deck is supported by a pair of front wheels 104 and a pair of rear wheels 106. An internal combustion engine 110 or other power source may be positioned on the mower deck for rotating a vertically aligned spindle and a mower blade turning under the deck.

In one embodiment, rear wheels 106 may be self propelled by a drive mechanism connected to the engine and controlled by the operator using traction drive/self-propel bar 114. The traction drive/self-propel bar may be hinged or slidably mounted to handle 102, and the operator may use the bar to propel the mower forward and control the drive speed of the rear wheels. The bar may be biased to a neutral position, and the operator may pivot the bar out of the neutral position to a range of forward drive positions corresponding to the position or angle of the bar relative to the handle. Additionally, the mower may include an operator presence bar 116 hinged to handle 102 in a manner requiring the operator to grip the bar in an operating position to avoid killing the engine and halting rotation of the mower blade.

Figure 3:
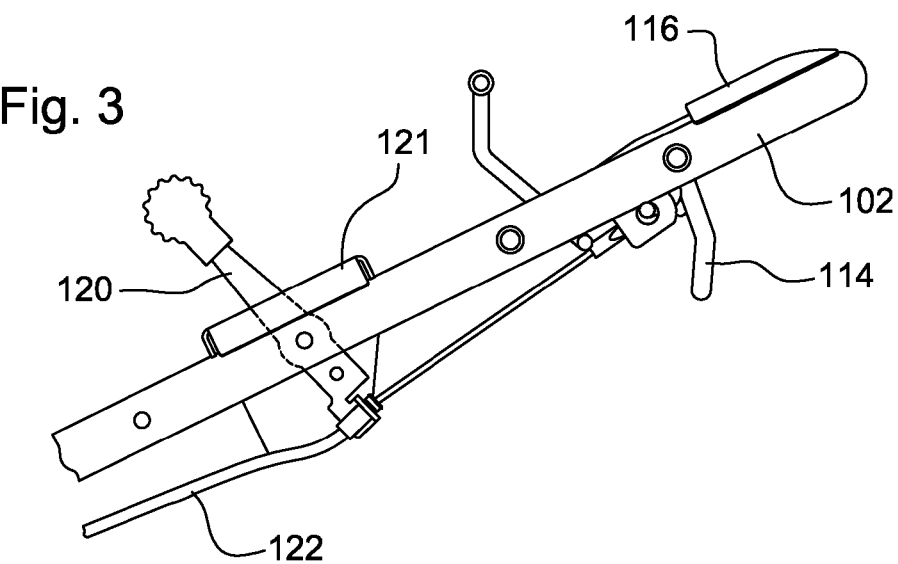
FIG. 3 is a side view of caster wheel locking system controls in the locked position according to a first embodiment of the invention.
Figure 4:
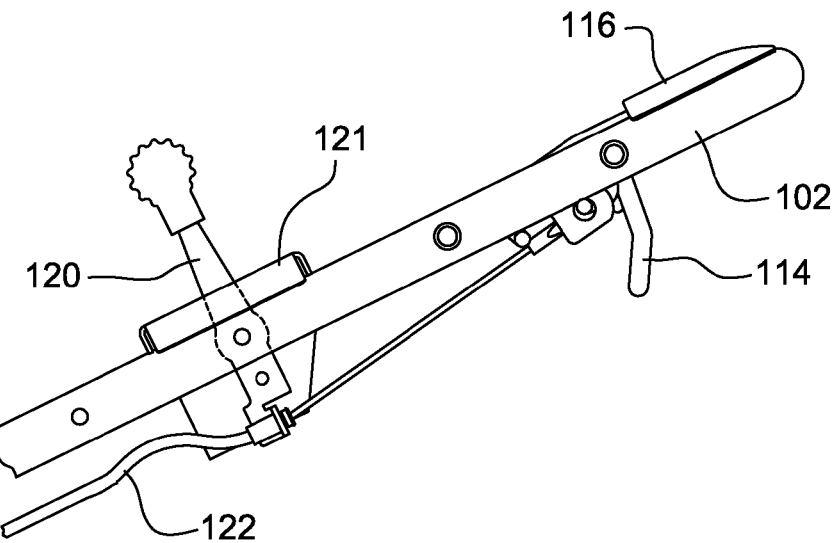
FIG. 4 is a side view of caster wheel locking system controls in the automatic position according to a first embodiment of the invention.
Figure 5:
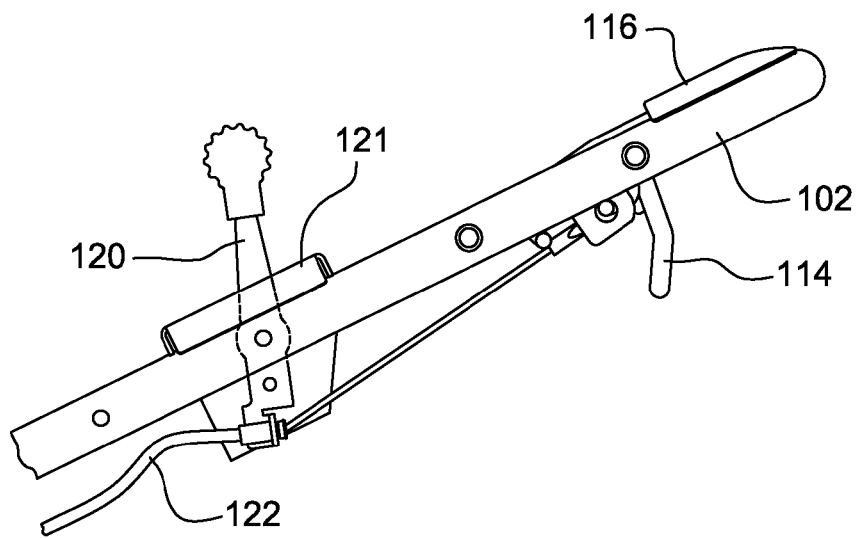
FIG. 5 is a side view of caster wheel locking system controls in the unlocked position according to a first embodiment of the invention.

In one embodiment, each front wheel may be rotatably mounted to a wheel mount 132 at the front end of a forward extending arm 126 attached to the mower deck. A caster wheel lock 112 may be provided between each wheel mount 132 and the forward extending arm 126. Each caster wheel lock 112 is part of a caster wheel locking system operable with caster control lever 120 pivotably mounted in lever housing 121 on handle 102. The operator may move caster control lever 120 between a locked position, an automatic position, and an unlocked position. The three different positions are shown in FIGS. 3-5 and are described below.

In one embodiment, bowden cable 122 may connect each caster wheel lock 112 to caster control lever 120. Each caster wheel lock may include an upright shaft 108 mounted in cylindrical bore 124 extending vertically through each caster wheel lock housing 118. Each upright shaft may have an opening or hole extending therethrough, which may be engaged by a spring loaded caster wheel locking pin 128.

In one embodiment, caster control lever 120 determines the position of cable 122 which determines the position of the spring loaded caster wheel locking pins at each of the front caster wheels by increasing or decreasing the tension on cable wire 133. An operator can quickly and easily change settings of the front caster wheels by moving lever 120 between a locked tracking position in which the front caster wheels are aligned in the forward direction, or an unlocked continuous free spin position. Additionally, an operator can move caster control lever 120 to an automatic position where the front caster wheels are locked only if traction bar 114 is engaged. In the automatic position, while the traction bar is engaged, there is reduced tension on linkage 136 (which may be a rod or cable) and wire 133. However, in the automatic position, while the traction bar is disengaged, there is increased tension on linkage 136 and wire 133, extracting pins 128 from the front caster wheels. As a result, if the traction bar is disengaged, the caster wheels are unlocked allowing them to steer around a turn. Traction bar 114 may be mechanically linked by a cable 136 which is fastened to the upper end of the bowden cable housing.

In one embodiment, spring loaded caster wheel locking pins 128 are mounted in each caster wheel lock housing. Spring 130 is provided around each pin to bias the pin into an opening 138 or hole in each upright shaft 108, and bowden cable 122 connected between the pin and caster control lever 120 is used by the operator to pull the pins away from the openings in the upright shafts via mechanical link 134. For example, the mechanical link at the lower end of the wire 133 may be a hook that engages the spring loaded caster wheel locking pin.

In one embodiment, bowden cable 122 is branched to each of the caster wheel locks on the left and right front caster wheels with a "T" or "Y" junction that provides equal force to each cable end.

As shown in FIG. 3, if the operator moves the caster control lever 120 to the locked or tracking position, the bowden cable attached to the lever does not exert enough tension on the inner cable, and does not displace the inner cable sufficiently, to pull the spring loaded caster wheel locking pins out from openings 138 in the upright shafts. As a result, the spring loaded caster wheel locking pins remain in the openings to prevent the upright shafts from pivoting in the cylindrical bore. The pins hold the upright shaft in the locked or tracking position so that the wheels are aligned to rotate forwardly, and cannot steer.

In FIG. 4, the caster control lever is in the automatic position. In the automatic position, bowden cable 122 pulls the spring loaded pins out of openings 138 in the upright shafts only if traction drive bar 114 is released to the neutral position. At that time, while the traction drive bar is released, the front caster wheels can pivot or steer. If the traction drive bar is engaged to drive the rear wheels forwardly, the bowden cable tension is released and allows the spring loaded pins to re-enter the openings. At that time, the front caster wheels are locked and aligned in the forward tracking position. Thus, the automatic position aligns the front caster wheels to track straight as the operator engages the traction drive bar, or steer freely as the operator disengages the traction drive bar.

FIG. 5 shows the caster control lever in the unlocked position. In the unlocked position, the bowden cable attached to the caster control lever pulls the spring loaded caster wheel locking pins out and away from openings 138 in the upright shafts so the caster wheels can freely steer. The spring loaded pins are not in the openings in the upright shafts, so the shafts can pivot within cylindrical bore 124 and the front caster wheels can pivot or steer freely.

Having described a preferred embodiment, it will become apparent that various modifications can be made without departing from the scope of the invention as defined in the accompanying claims.

The invention claimed is:

1. A caster wheel locking system for a walk-behind mower comprising:

a mower deck supported by a pair of front caster wheels and a pair of rear wheels, and a handle attached to the mower deck;

a traction drive bar connected to the handle and moveable between a neutral position and a forward drive position in which the pair of rear wheels rotate to propel the mower forward; and a caster wheel lock on each of the front caster wheels which locks the front wheels and aligns the front caster wheels in a forward direction, a cable from the caster wheel locks linked to the traction drive bar, and a caster control lever attached around an upper end of the cable to vary the tension on the cable to either lock the front caster wheels in a forward direction regardless of the position of the traction drive bar, unlock the front caster wheels regardless of the position of the traction drive bar, or lock the front caster wheels if the traction drive bar is in the forward drive position, and unlock the front caster wheels to allow the front caster wheels to steer freely if the traction drive bar is in the neutral position.

2. The caster wheel locking system of claim 1 wherein each caster wheel lock further comprises a spring loaded pin.

3. The caster wheel locking system of claim 2 wherein each front caster wheel is mounted to an upright shaft that the spring loaded pin can engage to lock the front caster wheels and align the front wheels in a forward direction.

4. The caster wheel locking system of claim 1 wherein each caster wheel lock is mounted between an arm extending forwardly from the mower deck and a wheel mount.

5. A caster wheel locking system for a walk-behind mower comprising:

a pin connected to a first end of a bowden cable and moveable into an opening in an upright shaft between a front wheel of the mower and a mower deck;

a traction drive bar on a handle of the walk-behind mower and movable between a neutral position and rear wheel drive positions; the traction drive bar connected through a linkage to a second end of the bowden cable; and a caster control lever mounted on the handle and connected to a sleeve around the second end of the bowden cable and moveable between a locked position in which the bowden cable moves the pin into the opening to align the front wheel in a non-steering position regardless of the traction drive bar position, an automatic position in which the bowden cable moves the pin into the opening only if the traction drive bar is in the rear wheel drive position, and an unlocked position in which the pin is retracted from the opening so the front wheel can steer freely regardless of the traction drive bar position.

6. The caster wheel locking system of claim 5 further comprising a spring biasing the pin to the locked position.

7. The caster wheel locking system of claim 5 wherein the linkage is a rod between the traction drive bar and the bowden cable.

8. The caster wheel locking system of claim 5 wherein the pin and the upright shaft are enclosed in a housing.

9. The caster wheel locking system of claim 5 wherein the traction drive is pivotable on the handle of the mower.

10. A caster wheel locking system for a walk-behind mower comprising:

a pair of front caster wheels rotatably mounted to a pair of front wheel mounts, and a pair of rear wheels that may be driven to propel the mower in a forward direction in response to moving a traction drive bar to a forward drive position; the front caster wheels and rear wheels supporting a mower deck;

a caster wheel lock mounted between each front wheel mount and the mower deck; and a handle on the mower deck having a caster control lever pivotably mounted thereto, and a cable between the traction drive bar and each caster wheel lock, the caster control lever attached to a housing around the cable and pivotable to lock the caster wheel locks in a forward tracking position regardless of the position of the traction drive bar, a free steering position regardless of the position of the traction drive bar, or an automatic position in which the caster wheel locks are locked in a forward tracking position only while the traction drive bar is in the forward drive position.

11. The caster wheel locking system of claim 10 wherein each caster wheel lock further comprises a spring loaded pin to controllably engage an opening in an upright shaft.

12. The caster wheel locking system of claim 10 further comprising a rod between the traction drive bar and the cable.

* * * * *